United States Patent [19]

Davies et al.

[11] Patent Number: 5,504,139
[45] Date of Patent: Apr. 2, 1996

[54] TOUGHENED POLYMERIC COMPOSITIONS AND METHODS OF IMPROVING FRICTION AND WEAR PROPERTIES OF TRIBOLOGICAL SYSTEMS

[75] Inventors: Mark Davies, Cleveland, United Kingdom; Anne E. Bolvari, West Chester, Pa.

[73] Assignee: Kawasaki Chemical Holding Co., Inc., Wilmington, Del.

[21] Appl. No.: 266,996

[22] Filed: Jun. 28, 1994

Related U.S. Application Data

[63] Continuation of Ser. No. 910,400, Jul. 8, 1992, abandoned.

[51] Int. Cl.$^6$ ............................ C08L 77/00; C08L 69/00; C08L 23/12; C08L 81/06
[52] U.S. Cl. ........................... 524/504; 524/514; 525/66; 525/179; 525/184; 525/67; 525/133; 525/148; 525/64
[58] Field of Search ........................... 525/66, 179, 184; 252/12, 12.4; 524/504, 514

[56] References Cited

U.S. PATENT DOCUMENTS

| | | | |
|---|---|---|---|
| 3,312,516 | 4/1967 | Krahn | 312/330 |
| 3,774,983 | 11/1973 | Lagally | 308/238 |
| 4,174,358 | 11/1979 | Epstein | 525/183 |
| 4,371,445 | 2/1983 | Faigle | 252/12 |
| 4,391,951 | 7/1983 | Scheetz | 525/166 |
| 4,501,676 | 2/1985 | Moorhouse | 252/12 |
| 4,832,422 | 5/1989 | Fortmann | 312/330 SM |
| 4,945,126 | 7/1990 | Crosby et al. | 524/507 |
| 4,987,170 | 1/1991 | Ishida et al. | 524/267 |
| 5,006,601 | 4/1991 | Lutz | 525/179 |
| 5,039,714 | 8/1991 | Kasahara et al. | 521/148 |
| 5,147,931 | 9/1992 | Sakuma | 525/66 |

FOREIGN PATENT DOCUMENTS

| | | | |
|---|---|---|---|
| 3804161 | 8/1989 | Germany. | |
| 5147043 | 4/1976 | Japan. | |
| 57-108152 | 6/1982 | Japan. | |
| 149940 | 8/1984 | Japan. | |
| 158739 | 7/1987 | Japan | 525/179 |
| 177065 | 8/1987 | Japan. | |
| 4897298 | of 1990 | Japan. | |
| 4987170 | of 1991 | Japan. | |
| 06174 | 8/1988 | WIPO | 525/66 |

OTHER PUBLICATIONS

Webster's Ninth New Collegiate Dictionary; 1983 entry for "tribology".

H. Voss et al., "On the Wear Behaviour of Short–Fibre–Reinforced PEEK Composites", 116 *Wear*, (1987), pp. 1–18.

*Primary Examiner*—David Buttner
*Attorney, Agent, or Firm*—Panitch Schwarze Jacobs & Nadel

[57] ABSTRACT

The present invention provides a polymeric composition including a blend of at least two different polymers selected from the group consisting of polystyrene, polycarbonate, polyetherimide, polyolefin, polysulphone, polyethersulphone, polyacetal, nylon, polyester, polyphenylene sulphide, polyphenylene oxide and polyetheretherketone and at least one elastomer having a tensile modulus less than about 50,000 p.s.i. Alternatively or additionally, the elastomer may be functionalized to graft with at least one of the polymers. The present invention also provides a method of making a tribological wear system by melt-mixing the polymeric composition to improve the wear resistance of a polymeric composite whose surface bears against another surface, thereby causing friction and wear of the polymeric composite.

10 Claims, 1 Drawing Sheet

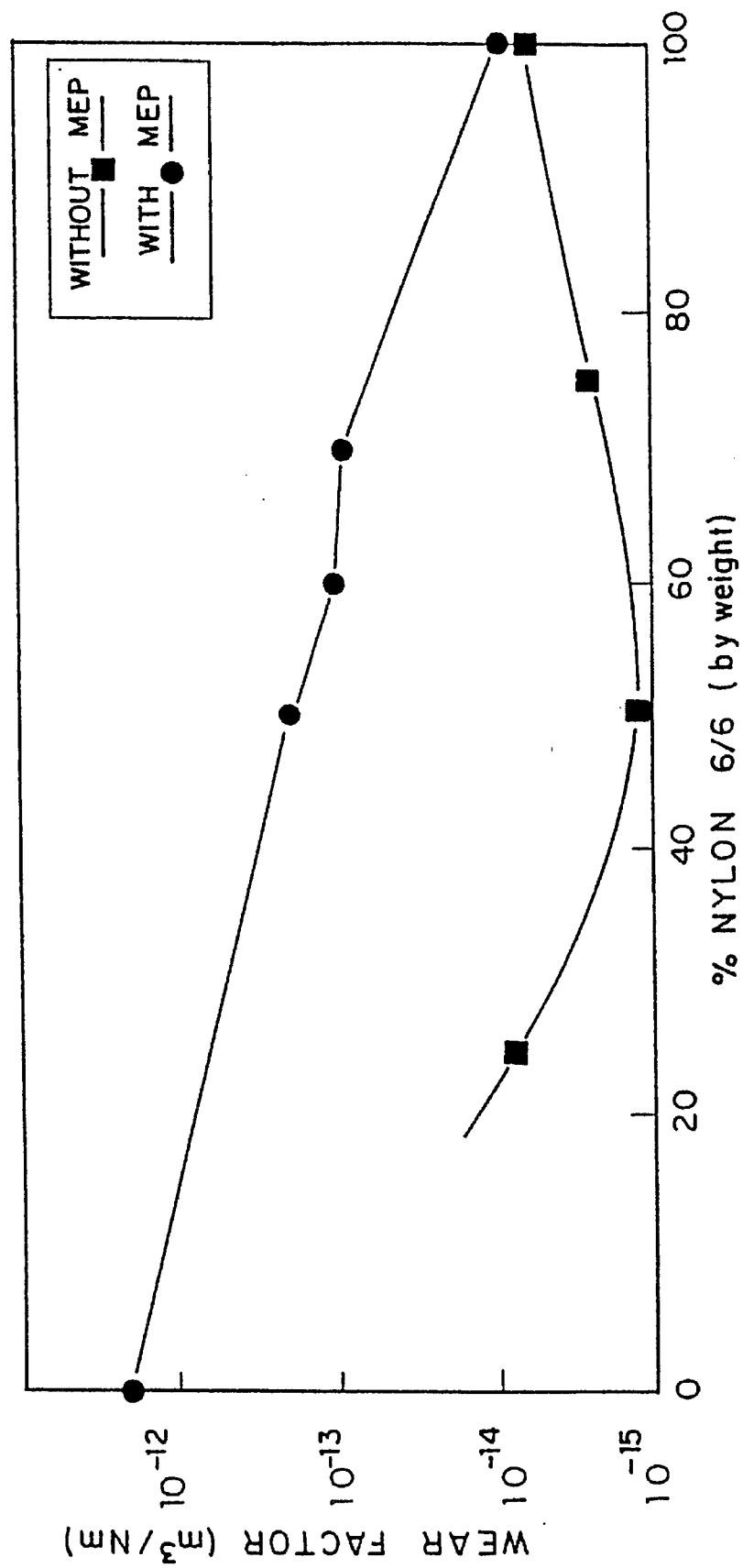

TOUGHENED POLYMERIC COMPOSITIONS AND METHODS OF IMPROVING FRICTION AND WEAR PROPERTIES OF TRIBOLOGICAL SYSTEMS

This is a continuation of Ser. No. 7-910,400 now abandoned filed Jul. 8, 1992.

FIELD OF THE INVENTION

The invention relates to toughened polymeric compositions for use in tribological wear systems, and more particularly, to toughening of a polymeric composition to enhance the wear properties of the polymeric composition.

BACKGROUND OF THE INVENTION

Traditional wear systems use external lubricants, such as oil or grease, to increase the wear resistance and reduce frictional losses between moving contacting components. However, such external lubricants often must be replaced periodically and may be unevenly distributed over the wear surface, resulting in increased cost and inefficiency of the wear system. In addition, traditional external lubricants are not desirable, for example, in the areas of food processing or photocopying where product contamination is a concern.

The need for external lubricants may be reduced or eliminated by the use of polymeric contacting components. Polymeric components may be easily and inexpensively manufactured by such processes as injection molding to form intricately shaped components such as gears, cams, bearings, slides, ratchets, pumps, electrical contacts and prostheses.

Polymeric contacting components provide an economical and essentially maintenance free alternative to typical prior art non-polymeric contacting components. Components formed from polymeric compounds have greater shock and vibration dampening, reduced weight, enhanced corrosion protection, decreased running noise, decreased maintenance and power use, and allow increased freedom of component design over non-polymeric components. Internal lubricants, such as polytetraflurorethylene, graphite, molybdenum disulfide, and various oils and reinforcing fibers may be included in polymeric components to enhance wear resistance and decrease frictional losses. However, typical prior art internal lubricants may be costly and increase the complexity and number of processing steps.

The prior art discloses various modified polymers having improved sliding properties and increased wear resistance. For example, U.S. Pat. No. 4,174,358 discloses toughened thermoplastic compositions having a polyamide matrix resin and at least one branched or straight chain toughening polymer. The polymer may be elastomeric or thermoplastic. Examples of suitable toughening polymers include synthetic and natural rubbers such as butadiene/acrylonitrile rubber, styrene/butadiene rubber, buna rubber, isobutylene, isoprene, natural rubber, ethyl acrylate, butyl acrylate rubbers, etc.

U.S. Pat. No. 4,371,445 discloses tribological systems of plastic/plastic pairings in which at least one of the partners is a plastic containing polar, cyclic compounds. The cyclic part of the molecule on at least one side may be coupled directly to an atom of Group V or Group VI of the Periodic Table or the ring may contain atoms of Group V or VI. An optional auxiliary sliding partner may be formed from a polyalkylene. A partner may consist of several materials, such as a mixture of two or more of polyethylene, polypropylene, polyisobutylene, polystyrene, polytetrafluoroethylene and polyvinylidene chloride.

U.S. Pat. No. 5,039,714 discloses a rubber-modified polystyrene composition containing a polystyrene, dispersed particles of elastomeric polymers and optionally polydimethylsiloxane and at least one member selected from mineral oil, and metallic salts or amides of higher fatty acids. The elastomeric polymers may include polybutadiene and styrene-polybutadiene copolymers. Rubber-modified polystyrene may be obtained by mixing and polymerizing styrene monomer in the presence of styrene-butadiene block copolymers or polybutadiene.

U.S. Pat. No. 4,987,170 discloses a styrene resin composition including styrene polymer, dimethylsilicone oil and a maleic anhydride monomer or a maleic anhydride-styrene copolymer. The styrene polymer may be modified with a rubber-like polymer, such as polybutadiene, styrene-butadiene copolymer, butadiene-acrylonitrile copolymer, ethylenepropylene-diene terpolymers and butadiene-acrylate copolymers. For example, a maleic anhydride-styrene copolymer may be modified with a rubber-like polymer.

SUMMARY OF THE INVENTION

According to the present invention, a polymeric composition is provided which has improved wear properties and which comprises a blend of at least two different polymers selected from the group consisting of polystyrene, polycarbonate, polyetherimide, polyolefin, polysulphone, polyethersulphone, polyacetal, nylon, polyester, polyphenylene sulphide, polyphenylene oxide and polyetheretherketone and at least one elastomer having a tensile modulus less than about 50,000 p.s.i. for toughening the polymers. Alternatively or additionally, the elastomer may be functionalized to graft with at least one of the polymers. Such compositions exhibit high wear resistance for use in components of tribological wear systems in which a surface of the polymeric composite bears against another surface causing friction and wear of the polymeric composite.

BRIEF DESCRIPTION OF THE DRAWING

The foregoing summary, as well as the following detailed description of the preferred embodiments, will be better understood when read in conjunction with the appended drawing. For the purpose of illustrating the invention, there is shown in the drawing an embodiment which is presently preferred, it being understood, however, that the invention is not limited to the specific arrangements and instrumentalities disclosed. In the drawing:

FIG. 1 is a graph of the wear factor as a function of weight percentage of nylon 6/6 in polyethersulphone.

DETAILED DESCRIPTION OF THE PREFERRED EMBODIMENTS

The present polymeric compositions possess similar or superior wear resistance, higher crack propagation resistance, lower yield strength and increased transfer film ductility over typical prior art polymers containing modifiers such as polytetrafluoroethylene or carbon or glass fibers. The present compositions, however, are less expensive and often easier to formulate than such prior art compositions. Polymer combinations may be selected which optimize the advantages and lessen the disadvantages of particular polymers, depending upon the intended use of components formed from the composition.

The present composition may be used to fabricate contacting components for tribological systems, such as those typically found in machinery or household appliances. In a typical tribological wear system, the surface of a polymeric composite is brought to bear against a dry or unlubricated metallic surface, such as steel. For friction and wear testing of the present invention, steel having an average surface roughness $R_a<0.1$ μ and a Rockwell hardness $R_c>50$ at room temperature (about 23° C.) was used as the metallic surface. Thus, above a metal hardness of $R_c=50$ the wear rate of polymeric components becomes independent of the metal surface hardness. Also, while components formed from the polymeric composition of the present invention are preferably used under dry conditions, the components may also be used under wet conditions or in contact with a wide variety of materials such as other polymers, etc.

The primary wear mechanism of polymeric components in dry, smooth-contact tribological wear systems under moderate load conditions is adhesive wear. As the polymeric and metal components are brought into loaded moving (e.g., sliding) contact, the surface of the polymeric composite shears and spreads to form a polymeric film which becomes chemically attached to the surface of the metal component, i.e., a transfer film is formed on the surface of the metal component. The adhesive wear is influenced by two factors, namely the amount of work being done on the polymeric surface and the intrinsic durability of the sliding interface. The wear factor K, or rate of decay of the polymeric material surface, is determined by the rate of attrition and subsequent replacement of the transfer film as new layers of the surface of the polymeric material are abraded by sliding contact with the metal component.

The present polymeric compositions may be used to form tribological wear components having high wear resistance (low wear factor), high crack propagation resistance and low yield strength for use in a wide variety of sliding components such as those discussed above. The high crack propagation resistance and low yield strength contribute to the high ductility of the transfer film formed on the surface of the components.

The present polymeric composition comprises a blend of at least two different polymers. For example, polymers which are useful in the present invention include polystyrenes, such as acrylonitrile-butadiene-styrene (ABS), styrene-acrylonitrile (SAN), and styrene-maleic anhydride (S-MA); polycarbonates; polyetherimides; polyolefins, such as polyethylene (PE) and polypropylene (PP); polysulphones; polyethersulphones (PES); polyacetals; polyamides, such as nylon-6, nylon-6/6, nylon-6/10, nylon-6/12; polyesters, such as polyethylene terephthalate (PET), polybutylene terephthalate (PBT), and polycyclohexylenedimethylene terephthalate (PCT); polyphenylene sulphides (PPS); polyphenylene oxides (PPO); and polyetheretherketones (PEEK). One of ordinary skill in the art would understand that more than two different polymers may be used, such as, for example, a blend of three or four different polymers. Polymer combinations may be selected to lessen the disadvantages and/or increase the advantages of particular polymers, such as decreasing warpage and cost or facilitating processing. For example, a blend of polycarbonate and ABS can be more easily processed at lower temperatures than polycarbonate alone.

The weight ratio of the first polymer to the second polymer should be about 5:95 to about 95:5. This ratio depends upon such factors as the choice of polymers to be blended, the physical characteristics of the individual polymers which are to be optimized or minimized, and the relative cost of each polymer. Preferably, the ratio is in the range of about 25:75 to about 75:25, and more preferably, about 50:50. Thus, the toughening elastomer (described below) seems to provide optimum properties when used in a relatively balanced bi-component blend of polymers.

It is preferred that at least one of the polymers is crystalline, and more preferably, that both polymers are crystalline. Generally, crystalline polymers exhibit superior mechanical properties over non-crystalline polymers. Table 1 sets forth typical structures of some polymers useful in the present invention.

TABLE 1

| Polymer | Structure |
| --- | --- |
| Polystyrenes | Amorphous |
| Polycarbonates | Amorphous |
| Polyetherimides | Amorphous |
| Polyolefins | Amorphous or crystalline |
| Polysulphones | Amorphous |
| Polyethersulphones | Amorphous |
| Polyacetals | Crystalline |
| Polyamides | Crystalline |
| Polyesters | Amorphous, semi-crystalline, or crystalline |
| Polyphenylene sulphides | Semi-crystalline |
| Polyphenylene oxides | Amorphous |
| Polyetheretherketones | Crystalline |

The polymers may be blended in any suitable manner which will be evident to those of ordinary skill in the art. For example, the polymers may be in the form of powders or, more preferably, pellets. The polymers may be blended by static or screw/auger-type mixing, for example. Preferably the polymers are combined in a twin-screw compounding extruder such as are commercially available from Werner Pfleiderer or a Buss kneader from Buss (America), Inc. of Elk Grove Village, Ill.

The present polymeric composition is a combination of the polymer blend discussed above and at least one toughening elastomer. Typical elastomers suitable for use in the present invention have glass transition temperatures less than about 20° C., and preferably less than about −20° C. As used herein, the term "elastomer" is defined to mean an amorphous polymer having a low glass transition temperature and high mobility of the polymer chain.

Preferably, the elastomer has a tensile modulus less than about 50,000 p.s.i. Alternatively or additionally, it is preferred that the elastomer be functionalized to graft with at least one of the polymers.

Examples of suitable elastomers include olefinic rubbers, styrenic rubbers, acrylic rubbers, elastomeric block copolymers, ethylene-propylene rubbers, and polyurethanes. Examples of functionalized elastomers include maleic anhydride-modified ethylene propylene (MEP), ethylene-propylene rubbers grafted with SAN and terpolymers of ethylene, ethyl acrylate and maleic anhydride. One of ordinary skill in the art would understand that one or more elastomers may be used in accordance with the present invention, as desired.

For example, in a Nylon 6/6, PP and MEP composite, the maleic anhydride component of the MEP grafts with the nylon polymer and the ethylene propylene component of the MEP is compatible with the polypropylene. The elastomer binds the polymers to increase the crack propagation resistance, lower the yield strength, and increase the ductility of the transfer film of the polymeric composite.

Elastomers may, for example, be in the form of powders or pellets. The elastomer may be added separately to the blended polymer pellets or the polymer and elastomer pellets may be blended simultaneously. The elastomer should comprise about 2 to about 20 weight percent of the polymer composite, and more preferably, about 5 to about 10 weight percent. The polymers and elastomers may be combined by a twin-screw compounding extruder or Buss kneader, for example, to form a polymer composite.

The polymer composite may also include other additives, such as fillers, reinforcing agents, lubricants, coloring agents, heat stabilizers, ultraviolet light stabilizers and processing aids. Specific examples of such additives include carbon fiber, carbon powder, glass fiber, glass powder, glass beads, aramid fiber, polyethylene terephthalate fiber, stainless steel fiber, ceramic fiber, ceramic powder, wollastonite, talc clay, mica, pigments, stearates, waxes, polytetrafluoroethylene powder, molybdenun disulfide and various oils, including silicone oil.

The addition of glass fiber improves the creep resistance, thermal conductivity and reduces the heat distortion of the composite. Carbon fiber may be added to the composite to increase strength, thermal conductivity, and creep and fatigue endurance. Other conventional additives for polymer composites will be readily apparent to those of ordinary skill in the art.

Preferably, the additive is mixed with the polymer composite after the polymers and elastomer have been blended, although one of ordinary skill in the art would understand that all of the components may be blended together concurrently. The components may be blended in a conventional twin screw-extruder or a Buss kneader, such as those discussed above. The additives may comprise up to about 60 weight percent of the polymeric composite, depending upon the particular additive and properties desired.

The composites of the present invention may be used in the same types of applications as other prior art composites, as where the surface of the composite bears against another surface, such as a metallic surface. The composites of the present invention have similar or superior wear properties in such situations, including low wear factors.

In the present invention, polymer blends may be created in which the advantages of individual polymer components offset disadvantages of other polymer components. For example, nylon processed alone is often susceptible to warpage. By combining one or more different polymers with nylon, such as polypropylene, warpage may be reduced or eliminated. Different polymers may be combined to form composites having enhanced physical properties, such as increased strength and temperature stability, decreased warpage; decreased cost; and simplified processing, such as decreased cycling time in molding operations.

The addition of one or more elastomers to the polymer blend provides toughened composites which have higher resistance to crack propagation and lower yield strength, as well as increased wear resistance and ductility of the transfer film formed as a result of sliding friction between such composites and contacting surfaces of other components.

The present invention will now be illustrated in more detail by reference to the following specific, non-limiting examples. Unless otherwise indicated, all percentages are by weight.

EXAMPLE 1

Nylon 6/6 and polypropylene (PP) composites were prepared by blending varying percentages of nylon 6/6 (Vydyne™ 21, available from the Monsanto Co. of St. Louis, Mo.) and polypropylene (Bamberger homopolymer grade 4042, available from Bamberger Polymers, Inc. of New Hyde Park, N.Y.). Varying percentages of elastomeric tougheners including maleic anhydride-modified ethylene propylene (MEP) pellets (Exelor™ 1801, available from Exxon Chemical Co. of Houston, Tex.); higher molecular weight MEP pellets (Royal Tuf™ 465A, available from Uniroyal Chemical Co. of Middlebury, Conn.); SAN EP rubber (Royal Tuf™ X372, also available from Uniroyal); a terpolymer of ethylene, ethyl acrylate and maleic anhydride (Lotader™ 4700, available from elf Atochem North America of Philadelphia, Pa.) were hand blended with the various polymer blends to form compositions of the present invention. Polytetrafluoroethylene (PTFE) powder (Witcon™ 156, available from ICI Americas, Inc. of Wilmington, Del.), a typical prior art modifier, was hand blended in different proportions with similar polymer blends for comparison with the test compositions of the present invention. Glass fiber (GF) (⅛" Manville™ 731, available from Manville Sales Corp. of Toledo, Ohio) was hand blended with several of the present and prior art polymer compositions. The compositions were extruded in a Werner Pfleiderer ZSK-40™ twin screw-extruder. The percentages of each component for each composite are set forth in Table 2.

The extrudate was comminuted into pellets and injection molded into ¼" thick tensile bars (according to ASTM Type 1 standards) which were cut into 6 mm×6 mm×6 mm cubes for wear testing. The friction and wear testing of each specimen was determined according to the "pin-on-ring" dry sliding wear test method. Wear factors (volumetric weight loss measured in units of $10^{-16}$ meter$^3$/ Newton meter (m$^3$/ Nm)) for each composite were based on equilibrium wear rates independent of break-in wear. The wear test was conducted at a test load of 27 Newtons (N) and a test speed of 1 meter/second (m/s) at room temperature (about 23° C.) against a mating metal surface of cold rolled carbon steel (Rockwell hardness>50). The average surface roughness ($R_a$) of the rotating hard metallic disc was less than about 0.1 microns. A nominal contact area of about 36 mm$^2$ was used, which corresponds to an apparent contact pressure of about 0.75 mega Pascals (MPa). After thermal equilibrium was established, the mass loss was determined at intervals of 30 or 60 minutes until a steady state condition was obtained over at least six periods of the mass loss measurements. The results of the friction and wear testing are set forth in Table 2. Each result is the mean average of four test runs conducted under the same test conditions.

The results indicate that a substantial improvement in wear resistance is achieved by the composites of the present invention for nylon 6/6-polypropylene blends over nylon 6/6 alone or nylon 6/6-PP blends including a typical prior art additive, such as polytetrafluoroethylene.

TABLE 2

| Run No. | Nylon 6/6 | PP | MEP | MEP* | SAN EP Rubber | Lotader | PTFE | Glass Fiber | Wear Factor ($m^3/Nm \times 10^{-16}$) | Coefficient of Kinetic Friction (u) |
|---|---|---|---|---|---|---|---|---|---|---|
| 1 | 100 | — | — | — | — | — | — | — | 90 | — |
| 2 | 95 | — | 5 | — | — | — | — | — | 60 | — |
| 3 | 80 | — | 20 | — | — | — | — | — | 30 | — |
| 4 | 50 | 50 | — | — | — | — | — | — | 13.0 | 0.70 |
| 5 | 47.5 | 47.5 | 5 | — | — | — | — | — | 4 | 0.52 |
| 6 | 72.5 | 22.5 | 5 | — | — | — | — | — | 6 | 0.45 |
| 7 | 22.5 | 72.5 | 5 | — | — | — | — | — | 9 | 0.45 |
| 8 | 55 | 30 | 15 | — | — | — | — | — | 3.7 | 0.82 |
| 9 | 23 | 70 | 7 | — | — | — | — | — | 6.4 | 0.80 |
| 10 | 47.5 | 47.5 | — | — | 5 | — | — | — | 14 | 0.62 |
| 11 | 47.5 | 47.5 | — | 5 | — | — | — | — | 47 | 0.69 |
| 12 | 47.5 | 47.5 | — | — | — | 5 | — | — | 11 | 0.41 |
| 13 | 42.5 | 42.5 | 5 | — | — | — | — | 10 | 12 | 0.44 |
| 14 | 42.75 | 42.75 | 4.5 | — | — | — | — | 10 | 14 | 0.42 |
| 15 | 38 | 38 | 4 | — | — | — | — | 20 | 17.5 | 0.44 |
| 16 | 80 | — | — | — | — | — | 20 | — | 7.2 | 0.35 |
| 17 | — | 80 | — | — | — | — | 20 | — | 4.2 | 0.50 |
| 18 | — | 64 | — | — | — | — | 16 | 20 | 3.5 | 0.28 |
| 19 | 47.5 | 47.5 | — | — | — | — | 5 | — | 8 | 0.51 |
| 20 | 42.5 | 42.5 | — | — | — | — | 5 | 10 | 15 | 0.48 |
| 21 | 42.5 | 42.5 | — | — | — | — | 5 | 10 | 15 | 0.41 |

*Uniroyal Royal Tuf™ 465A

Run No. 1 shows that a composition consisting of 100% Nylon 6/6 has a wear factor of $90 \times 10^{-16}$ $m^3/Nm$. In contrast, a 50/50 blend of nylon 6/6 and polypropylene has a wear factor of $13.0 \times 10^{-16}$ $m^3/Nm$ and a coefficient of kinetic friction of 0.70 (Run No. 4). The addition of 5% PTFE to the blend provided a composite having a lower wear factor and coefficient of kinetic friction than the blend of only nylon 6/6 and polypropylene. More specifically, the wear factor for the composite having 5% PTFE was $8 \times 10^{-16}$ $m^3/Nm$ and the coefficient of kinetic friction was 0.51 (Run No. 19). The addition of 10% glass fiber to a proportionate amount of nylon 6/6, polypropylene, and PTFE (Run No. 21) provided a composite having a wear factor of $15 \times 10^{-16}$ $m^3/Nm$, which is greater than that of the composite of nylon 6/6, polypropylene and PTFE.

Significantly, a blend according to the present invention of 47.5% nylon 6/6, 47.5% propylene and 5% maleic anhydride-modified ethylene propylene (Run No. 5) provides a composite having superior wear resistance than the prior art blends previously discussed. More specifically, the coefficient of kinetic friction of the blend of Run No. 5 is about 0.52 and the wear factor, $4 \times 10^{-16}$ $m^3/Nm$, is significantly less than that obtained by addition of PTFE or PTFE and glass fiber to a nylon 6/6 and polypropylene blend.

Typically, nylon is about twice as expensive as polypropylene. While nylon is subject to less warpage than polypropylene, it can be difficult to process. A blend of nylon and polypropylene counterbalances these drawbacks and provides less expensive composites having less warpage and better molding characteristics than either polymer alone. However, a blend of nylon and polypropylene alone has insufficient strength and wear resistance for increasingly demanding tribological applications. Conventional prior art additives which may increase strength and wear resistance, such as PTFE, are often prohibitively expensive. Therefore, the present invention of combining a blend of nylon 6/6 and PP with an elastomeric toughener, such as MEP, to provide increased impact strength, wear resistance and high crack propagation resistance at reasonable cost represents a significant breakthrough in the tribological art.

EXAMPLE 2

Nylon 6/6 and polyethersulphone (PES) composites were prepared by blending varying percentages of nylon 6/6 (Vydyne™ 21) and PES (ICI Victrex™ PES 4100G, available from ICI). The composition of each composite tested is set forth in Table 3. Varying percentages of MEP pellets (Exelor™ 1801) were blended with the nylon 6/6-PES composite and appropriate wear specimens were fabricated. Friction and wear testing were carried out as in Example 1. For several of the samples, the bulk toughness ($G_{IC}$) in $KJ/m^2$ was determined. It is believed that the durability of the transfer layer formed by the composition during wear may be approximated by the bulk toughness of the polymeric compound. If the bulk toughness increases and/or the coefficient of kinetic friction decreases, a drop in the wear factor may also be expected.

As best shown in FIG. 1, it is believed that MEP acts as a compatibilizer to lessen the wear factor, increase crack propagation resistance and increase the ductility of the transfer film of the polymer composites of the present invention. An optimum change in wear factor is observed at about a 50/50 blend of nylon 6/6 and PES.

As shown in Table 3, a 100% composition of PES (Run No. 26) had a wear factor of $20,0000 \times 10^{-16}$ $m^3/Nm$. The wear factor of nylon 6/6 alone (Run No. 22) was $90 \times 10^{-16}$ $m^3/Nm$. While PES has a much higher wear factor than nylon 6/6, it is desirable to combine PES and nylon 6/6 to produce a composition having better temperature stability than nylon alone. A 50/50 blend of nylon 6/6 and PES (Run No. 25) has a wear factor of $2000 \times 10^{-16}$ $m^3/Nm$.

A 50/50 blend of nylon 6/6 and PES and 5% MEP (Run No. 30) provides a composite having not only a low wear factor ($12 \times 10^{-16}$ $m^3/Nm$), but also high bulk toughness and a low coefficient of kinetic friction. Increasing the percentage of MEP to 20% (Run No. 32) provides a composite having an even lower wear factor, namely $10 \times 10^{-16}$ $m^3/Nm$. The addition of an elastomeric toughener, such as MEP, further increases the toughness and therefore the usefulness of nylon 6/6 and PES compositions in components of tribological systems.

Therefore, the combination of a toughening elastomer of the present invention and glass fiber reduces the wear factor and increases the toughness of a polymeric composition of nylon 6/6 and HDPE.

TABLE 3

| Run No. | Composition (Weight Percent) | | | Bulk Toughness $G_{IC}$ (KJ/m$^2$) | Wear Factor (m$^3$/Nm × 10$^{-16}$) | Coefficient of Kinetic Friction (u) |
|---|---|---|---|---|---|---|
| | Nylon 6/6 | PES | MEP | | | |
| 22 | 100 | — | — | — | 90 | — |
| 23 | 70 | 30 | — | — | 900 | — |
| 24 | 60 | 40 | — | — | 1000 | — |
| 25 | 50 | 50 | — | — | 2000 | — |
| 26 | 0 | 100 | — | — | 20,000 | — |
| 27 | 95 | — | 5 | — | 60 | — |
| 28 | 80 | — | 20 | — | 30 | — |
| 29 | 71.5 | 23.5 | 5 | 1.30 | 25 | 0.34 |
| 30 | 47.5 | 47.5 | 5 | 1.71 | 12 | 0.33 |
| 31 | 23.5 | 71.5 | 5 | 1.06 | 75 | 0.27 |
| 32 | 40 | 40 | 20 | — | 10 | — |

EXAMPLE 3

Nylon 6/6 and high-density polyethylene (HDPE) composites were prepared by blending varying percentages of nylon 6/6 (Vydyne™ 21) and HDPE (Dow™ 10062N,

TABLE 4

| Run No. | Composition (Weight Percent) | | | | | | Wear Factor (m$^3$/Nm × 10$^{-16}$) | Coefficient of Kinetic Friction (u) |
|---|---|---|---|---|---|---|---|---|
| | Nylon 6/6 | HDPE | MEP | PTFE | EP | GF | | |
| 33 | 100 | — | — | — | — | — | 90 | — |
| 34 | 80 | — | — | 20 | — | — | 7.2 | 0.35 |
| 35 | 80 | 20 | — | — | — | — | 5.5 | 0.24 |
| 36 | 80 | 15 | — | — | 5 | — | 3.0 | 0.24 |
| 37 | 47.5 | 47.5 | 5 | — | — | — | 15 | 0.30 |
| 38 | 42.5 | 42.5 | 5 | — | — | 10 | 13 | 0.45 |
| 39 | 38 | 38 | 4 | — | — | 20 | 12 | 0.45 | available from Dow Chemical U.S.A. of Midland, Mich.). Varying percentages of the prior art PTFE powder (Witcon™ TL-156), glass fiber (GF) (⅛" Manville™ 731), and toughening elastomers of the present invention, namely MEP (Exelor™ 1801) and ethylene-propylene (EP) rubber (Nordel™ 4167, available from E. I. dupont de Nemours of Wilmington, Del.), were individually blended with the nylon 6/6 and HDPE compositions and specimens were formed and tested as set forth in Example 1. The percentages of each component are set forth in Table 4.

Nylon 6/6 alone (Run No. 33) has a wear factor of 90×10$^{-16}$ m$^3$/Nm. The addition of 20% PTFE, a typical prior art substitution, produces a composite (Run No. 34) having a wear factor of 7.2×10$^{-16}$ m$^3$/Nm and a coefficient of kinetic friction of 0.35. When 20% HDPE is added to nylon 6/6 instead of PTFE, the wear factor of the resulting composite (Run No. 35) is 5.5×10$^{16}$ m$^3$/Nm and the coefficient of friction is 0.24, less than the PTFE composite. When 5% of the HDPE is replaced with a toughening elastomer of the present invention (i.e., ethylene-propylene rubber), the wear factor of the resulting composite (Run No. 36) is only 3.0×10$^{-16}$ m$^3$/Nm.

The addition of 5% MEP to a 50/50 blend of nylon 6/6 and HDPE produces a composite (Run No. 37) having a wear factor of 15×10$^{-16}$ m$^3$/Nm, which is less than the wear factor of nylon 6/6 alone (Run No. 33). When 10% of the nylon 6/6 and HDPE is replaced by glass fiber, the wear factor of the resulting composite (Run No. 38) is only 13×10$^{-16}$ m$^3$/Nm Clearly, the addition of a toughening elastomer of the present invention to a polymeric composition of nylon 6/6 and HDPE reduces the wear factor and coefficient of friction and increases the toughness of such a polymeric composition.

EXAMPLE 4

Composites of polycarbonate (PC) and polypropylene (PP) or acrylonitrile-butadiene-styrene (ABS), or PP and acetal, were prepared by blending varying percentages of PC (Makrolon™ M40, available from Mobay Corp. of Pittsburgh, Pa.), PP (Bamberger 4042), ABS (ABS 340™, available from Dow Chemical), and acetal (Acetal M9004™, available from Hoechst Celanese Corp. of Summit, N.J.). These composites were blended with varying percentages of several typical prior art additives, such as PTFE, carbon fiber (1805AS™, available from Hercules, Inc. of Wilmington, Del.) and glass fiber and several toughening elastomers useful in the present invention, such as MEP, acrylic rubber (Paraloid™ EXL-3301, available from Rohm & Haas Co. of Philadelphia, Pa.), EP rubber (Nordel™ 4167), and SAN EP rubber (Royal-Tuf™ X372, available from Uniroyal Chemical Co. of Middlebury, Conn.). The composition of each composite tested is set forth in Tables 5 and 6. Wear specimens were fabricated and tested as in Example 1.

As shown in Table 5, polycarbonate alone (Run No. 40) has a wear factor of 15,000×10$^{-16}$ m$^3$/Nm. The addition of 20% PTFE to polycarbonate provides a composite (Run No. 43) having a much lower wear factor, namely 34×10$^{-16}$ m$^3$/Nm. The addition of 5 volume % glass fiber to polycarbonate provides a composite (Run No. 52) having a wear factor higher than that of the PTFE-filled polycarbonate, namely 83×10$^{-16}$ m$^3$/Nm. As the percentage of glass fiber is increased, the wear factor increases, as shown in Table 6. As shown in Table 5, the addition of 16% PTFE and 20 weight % glass fiber to polycarbonate provides a composite (Run No. 50) having a lower wear factor, namely 3.5×10$^{-16}$ m$^3$/Nm. The addition of about 24.7% carbon fiber to polycarbonate provides a composite (Run No. 58) having a similar wear factor to that of the PTFE and glass fiber composite.

to bonding of the functionalized maleic anhydride portion of the MEP to the polycarbonate.

The composites of the present invention permit relatively expensive polymers to be combined with less expensive polymers to form composites having similar or improved strength, wear resistance and lower crack propagation than prior art composites. Mixtures of different polymers permits optimization of physical characteristics of the resulting composite, such as strength, warpage, temperature stability and processing ease. Traditional prior art additives are often costly and, as in the case of glass fiber, may require additional processing steps. The present invention provides toughened polymeric compositions having similar or supe-

TABLE 5

| Run No. | Composition (Weight Percent) | | | | | | | | | | | Wear Factor (m$^3$/Nm × 10$^{-16}$) | Coefficient of Kinetic Friction (u) |
|---|---|---|---|---|---|---|---|---|---|---|---|---|---|
| | PC | PP | ABS | Acetal | MEP | PTFE | Acrylic Rubber | EP Rubber | SAN EP | Carbon Fiber | Glass Fiber | | |
| 40 | 100 | — | — | — | — | — | — | — | — | — | — | 15,000 | — |
| 41 | 96 | — | — | — | — | 4 | — | — | — | — | — | 72 | — |
| 42 | 90 | — | — | — | — | 10 | — | — | — | — | — | 42 | — |
| 43 | 80 | — | — | — | — | 20 | — | — | — | — | — | 34 | — |
| 44 | 95 | — | — | — | — | — | 5 | — | — | — | — | 9000 | — |
| 45 | 90 | — | — | — | — | — | — | 10 | — | — | — | 900 | — |
| 46 | 47.5 | 47.5 | — | — | 5 | — | — | — | — | — | — | 28 | 0.27 |
| 47 | 47.5 | 47.5 | — | — | — | — | 5 | — | — | — | — | 750 | 0.53 |
| 48 | 47.5 | — | 47.5 | — | — | — | 5 | — | — | — | — | 6000 | 0.43 |
| 49 | 47.5 | — | 47.5 | — | — | — | — | — | 5 | — | — | 7500 | 0.50 |
| 50 | 64 | — | — | — | — | 16 | — | — | — | — | 20 | 3.5 | 0.28 |
| 51 | — | 47.5 | — | 47.5 | — | — | 5 | — | — | — | — | 6 | 0.76 |

TABLE 6

| Run No. | Composition (Volume Percent) | | | | | | | | | | | Wear Factor (m$^3$/Nm × 10$^{-16}$) | Coefficient of Kinetic Friction (u) |
|---|---|---|---|---|---|---|---|---|---|---|---|---|---|
| | PC | PP | ABS | Acetal | MEP | PTFE | Acrylic Rubber | EP Rubber | SAN EP | Carbon Fiber | Glass Fiber | | |
| 52 | 95 | — | — | — | — | — | — | — | — | — | 5 | 83 | — |
| 53 | 90 | — | — | — | — | — | — | — | — | — | 10 | 152 | — |
| 54 | 80 | — | — | — | — | — | — | — | — | — | 20 | 207 | — |
| 55 | 70 | — | — | — | — | — | — | — | — | — | 30 | 245 | — |
| 56 | 96.1 | — | — | — | — | — | — | — | — | 3.9 | — | 26 | — |
| 57 | 87.9 | — | — | — | — | — | — | — | — | 12.1 | — | 6 | — |
| 58 | 75.3 | — | — | — | — | — | — | — | — | 24.7 | — | 4 | — |

All of the aforementioned composite blends include relatively expensive additives, such as PTFE and carbon fiber. In the present invention, a 50/50 blend of PC and PP having 5% MEP (Run No. 46) has a wear factor of 28×10$^{-16}$ m$^3$/Nm and a coefficient of kinetic friction of 0.27. These values are comparable to or lower than those of the prior art PC/PP composites discussed above. Polypropylene may be obtained for about one third of the cost of the same amount of polycarbonate. The addition of 5% MEP to a 50/50 blend of PC and PP provides a composite having a wear factor lower than that of a composite of polycarbonate and 20% PTFE at a far lower cost.

Table 5 also shows that MEP is a preferred elastomer for use in the present invention. A composite of a 50/50 blend of PC, PP and 5% MEP (Run No. 46) has a lower wear factor and coefficient of kinetic friction than a composite of a similar blend and 5% acrylic rubber (Run No. 47). It is believed that the lower wear factor value may be attributed rior wear properties to prior art polymeric compositions at reduced cost, thereby fulfilling a long-felt need in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

We claim:

1. A method of improving the adhesive wear properties of a polymeric composite in a dry, smooth contact sliding tribological wear system wherein a surface of said polymeric composite bears against another surface causing friction and adhesive wear of said polymeric composite, the method consisting essentially of the steps of:

(a) providing a polyamide and a polyolefin, the ratio of said polyamide to said polyolefin being about 30:70 to about 70:30;

(b) providing an elastomer selected from the group consisting of maleic anhydride-modified ethylene-propylene rubber and terpolymers of ethylene, ethylene acrylate and maleic anhydride, said elastomer being functionalized to graft with said polyamide; and (c) melt mixing said polyamide, said polyolefin and said elastomer, such that said elastomer reacts with and grafts to said polyamide to form said composite, said composite consisting essentially of said polyamide, said polyolefin and said elastomer, and wherein the composite has an increased wear resistance and a wear factor of no greater than about $47 \times 10^{-16}$ m$^3$/Nm in the tribological wear system.

2. A method according to claim 1, wherein at least one of said polymers is crystalline.

3. A method according to claim 1, wherein said polymide is selected from the group consisting of nylon-6, nylon-6/6, nylon-6/10, nylon-6/12.

4. A method according to claim 1, wherein said elastomer comprises about 2 to about 20 weight percent of the composite.

5. A method according to claim 1, wherein in step (c), a reinforcing agent selected from the group consisting of glass fiber and carbon fiber is mixed with said elastomer, said polyolefin and said polyamide.

6. A method according to claim 5, wherein said reinforcing agent comprises up to about 60 percent of the composite.

7. The method according to claim 1, wherein the ratio of said polyamide to said polyolefin is about 50:50.

8. The method according to claim 1, wherein the polyolefin is selected from the group consisting of polyethylene, polypropylene and high density polyethylene.

9. The method according to claim 1, wherein the elastomer is maleic anhydride-modified ethylene-propylene rubber.

10. The method according to claim 9, wherein the maleic anhydride-modified ethylene-propylene rubber comprises about 4 to about 15 weight percent of the composite.

* * * * *